(12) United States Patent
Nakakubo

(10) Patent No.: US 7,960,066 B2
(45) Date of Patent: Jun. 14, 2011

(54) FUEL CELL SYSTEM

(75) Inventor: Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/620,373

(22) Filed: Jan. 5, 2007

(65) Prior Publication Data

US 2007/0172709 A1    Jul. 26, 2007

(30) Foreign Application Priority Data

Jan. 25, 2006   (JP) .................. 2006-016874

(51) Int. Cl.
*H01M 8/02* (2006.01)
*H01M 8/04* (2006.01)
*H01M 8/24* (2006.01)
(52) U.S. Cl. ........ 429/444; 429/446; 429/458; 429/459; 429/513
(58) Field of Classification Search .............. 429/443, 429/444, 446, 458, 459, 513
See application file for complete search history.

(56) References Cited

U.S. PATENT DOCUMENTS

| 4,988,583 | A | 1/1991 | Watkins et al. |
| 5,108,849 | A | 4/1992 | Watkins et al. |
| 6,423,437 | B1 | 7/2002 | Kenyon et al. |

FOREIGN PATENT DOCUMENTS

| JP | 63119166 A | * | 5/1988 |
| JP | 3-205763 A | | 9/1991 |
| JP | 6-267564 A | | 9/1994 |

* cited by examiner

*Primary Examiner* — Gregg Cantelmo
(74) *Attorney, Agent, or Firm* — Fitzpatrick, Cella, Harper & Scinto

(57) ABSTRACT

There is provided a fuel cell system including a supply port, a supply-side main flow path, a discharge-side main flow path, a plurality of branch flow paths, and a discharge port, wherein with respect to each of the branch flow paths, the magnitudes of flow path resistances of predetermined portions of the flow paths satisfy specified mutual relationships. Thereby, a fuel cell system is provided that can effectively expel impurity gas that resides/accumulates in a power generation cell, even at a small flow rate of low-pressure hydrogen gas.

1 Claim, 10 Drawing Sheets

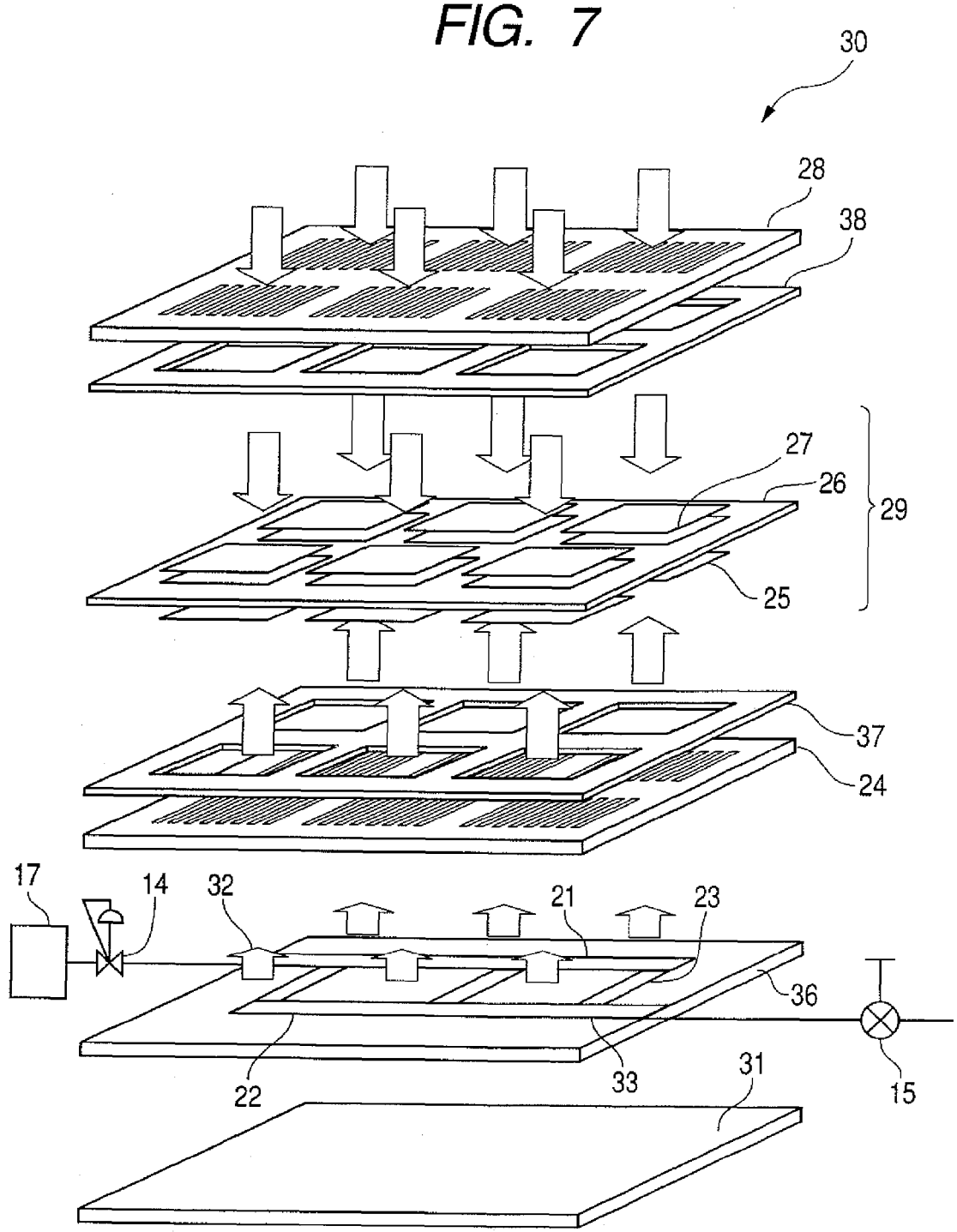

FUEL CELL SYSTEM

BACKGROUND OF THE INVENTION

1. Field of the Invention

The present invention relates to a fuel cell system that distributes and supplies fuel gas to a plurality of power generation cells, and more particularly to a structure that effectively expels unnecessary air as well as liquid that accumulated in a fuel diffusion space of a power generation cell from the power generation cell.

2. Description of the Related Art

In a fuel cell, the amount of electric energy that can be extracted per volume and per weight is significantly greater than for a conventional secondary battery, and the cell body can be used repeatedly by supplying fuel. Consequently, there are great hopes for the use of fuel cells as not only stationary-type power generating equipment, but also as power sources for portable electronic devices such as digital cameras, mobile phones and notebook personal computer.

Since a small and lightweight fuel cell system is suitable as a power supply for a portable electronic device, an air breathing type fuel cell system has been proposed in which atmospheric oxygen and hydrogen gas are reacted using a polymer electrolyte membrane. In the air breathing fuel cell system, in a power generation cell, catalyst layers are disposed on both sides of a polymer electrolyte membrane, with a fuel diffusion layer being overlaid on the catalyst layer on the fuel supply side and an oxygen diffusion layer being overlaid on the catalyst layer on the oxygen supply side. Generally, the air breathing fuel cell system is designed in a form having no recirculation mechanism that causes fuel gas to continuously flow and recirculate in the power generation cell. More specifically, it is a so-called dead-ended fuel cell system in which hydrogen gas supplied from a fuel tank or fuel forming apparatus is fed into a sealed fuel diffusion space and completely consumed with a polymer electrolyte membrane.

However, when a dead-ended fuel supply is performed, impurity gas such as moisture, nitrogen gas, or carbon dioxide gradually increases in the sealed fuel diffusion space. The impurity gas that resides inside the fuel diffusion space lower the partial pressure of the hydrogen gas and obstruct the hydrogen supply to the polymer electrolyte membrane.

U.S. Pat. No. 6,423,437 discloses an air breathing fuel cell system that performs a dead-ended fuel supply. In this case, an absorber of impurity gas is disposed in a power generation cell that is most distant from the fuel supply side of stacked cells, thereby removing impurity gas from the sealed hydrogen gas supply space.

Japanese Patent Application Laid-Open No. H03-205763 discloses a fuel cell system in which hydrogen gas is caused to flow and recirculate. In this system, impurity gas is expelled from the fuel space of a power generation cell by allowing hydrogen gas to flow through the fuel space. Since impurity gas that remains in the fuel space is diluted by newly supplied hydrogen gas, there is no concern of residence/accumulation of impurity gas in the fuel space leading to an increase in the concentration of impurity gas therein.

Japanese Patent Application Laid-Open No. H06-267564 discloses a fuel cell system in which, as a polymer electrolyte membrane, a plurality of power generation cells that use a fluororesin ion-exchange membrane containing sulfonic acid groups are stacked and connected in series. In this system, the thicknesses of oxygen diffusion layers are varied to reduce a variation in the oxygen supply to the polymer electrolyte membrane surface.

According to the passive method of removing impurity gas disclosed in U.S. Pat. No. 6,423,437 above, since impurity gas accumulates in the sealed fuel space, the total amount of impurity gas that can be eliminated is limited. Further, in a case where a fuel cell is left as it is without supplying fuel while a load is connected to the fuel cell, there is a possibility that the hydrogen gas in the fuel space will be completely consumed and the fuel diffusion layer will be completely filled with impurity gas, and in that case it is also difficult to completely remove the excessive impurity gas.

According to the active method of removing impurity gas as disclosed in Japanese Patent Application Laid-Open No. H03-205763 above, although residence/accumulation of impurity gas in a power generation cell can be temporarily avoided, unless an equipment that removes impurity gas is provided in the hydrogen gas circulation system, the impurity gas in the circulation system cannot be fundamentally removed. Further, since provision of a hydrogen gas circulation system itself inhibits size reduction, weight reduction, and cost reduction of the fuel cell system, it is not suitable for a power source of a portable electronic device.

Consequently, technology has been proposed that expels impurity gas which resides/accumulates in a power generation cell automatically or manually when needed by using a purge mechanism for replacing the air in the hydrogen supply system with hydrogen gas. However, unlike the case of a factory, households and the like have no choice other than to utilize a small-capacity fuel tank or a low-pressure forming apparatus, and thus an adequate hydrogen gas pressure or flow rate cannot be secured. Accordingly, in a conventional purge mechanism configured on the assumption of use of a large volume of hydrogen gas at a high pressure, a sufficient purge effect cannot be achieved.

SUMMARY OF THE INVENTION

It is, therefore, an object of the present invention to provide a fuel cell system that can stably supply hydrogen in a dead-ended fuel cell and can also effectively expel impurity gas that resides/accumulates in a power generation cell even with a small quantity of low-pressure hydrogen gas.

It is another object of the present invention to provide a flow type fuel cell system that, using the same configuration, reduces a variation in the fuel supply to a plurality of power generation cells.

The present invention provides a fuel cell system which comprises a supply port, a supply-side main flow path, a discharge-side main flow path, a plurality of branch flow paths, and a discharge port, in which the supply-side main flow path is connected to a supply port; the plurality of branch flow paths are, respectively, connected to the supply-side main flow path and the discharge-side main flow path; the plurality of branch flow paths each has at least one power generation cell; and the discharge-side main flow path is connected to a discharge port, wherein the plurality of branch flow paths include at least a first branch flow path and a second branch flow path, and with respect to each of the branch flow paths, the magnitude of a flow path resistance obtained by summing a flow path resistance from the supply port to a junction between the supply-side main flow path and the first branch flow path and a flow path resistance from a junction of the first branch flow path with the supply-side main flow path to a junction of the first branch flow path with the discharge-side main flow path is less than a flow path resistance obtained by summing a flow path resistance from the supply port to a junction of the supply-side main flow path with the second branch flow path that is different from the first branch flow path, a flow path resistance from a junction of the second branch flow path with the supply-side main flow path to a junction between the second branch flow path and the discharge-side main flow path, and a flow path resistance from a junction between the second branch flow path and the discharge-side main flow path to a junction between the first branch flow path and the discharge-side main flow path.

In the present invention, it is preferable that the flow path resistance of the first branch flow path is larger than each of the flow path resistance from the supply port to the junction between the supply-side main flow path and the first branch flow path, and the flow path resistance from the junction between the first branch flow path and the discharge-side main flow path to the discharge port.

Further, it is also preferable that when the number of the branch flow paths of the fuel cell system is N; the flow path resistance from a junction between the (n−1)th branch flow path counting from the side near the supply port and the supply-side main flow path to a junction between the $n^{th}$ branch flow path and the supply-side main flow path is $R_{n1}$, and the flow path resistance from a junction between the $n^{th}$ branch flow path and the supply-side main flow path to a junction between the $n^{th}$ branch flow path and the discharge-side main flow path is represented by $R_{n3}$, then the relationship:

$$\sum_{k=1}^{n} R_{k1} + R_{n3} > \sum_{k=1}^{m} R_{k1}$$

is satisfied (provided n<m<N and 2<n).

Further, it is also preferable that when the direction of the fuel gas flowing through the supply-side main flow and the direction of the fuel gas flowing through the discharge-side main flow path are opposite to each other, and the flow path resistance from a junction between the $n^{th}$ branch flow path and the supply-side branch flow path to a junction between the $n^{th}$ branch flow path and the discharge-side main flow path is represented by $R_{n3}$, the relationship of $R_{n3}>R_{m3}$ (n<m) is satisfied.

Another aspect of the present invention provides a fuel cell system which comprises a supply port, a supply-side main flow path, a discharge-side main flow path, a plurality of parallel branch flow paths, and a discharge port, in which the supply-side main flow path is connected to a supply port; the plurality of branch flow paths are, respectively, connected to the supply-side main flow path and the discharge-side main flow path; the plurality of branch flow paths each has at least one power generation cell; and the discharge-side main flow path is connected to a discharge port, wherein when fuel gas is supplied from the supply port at a pressure of normal operation and is discharged from the discharge port, with respect to each of the branch flow paths, a pressure inside the power generation cell of the branch flow path is higher than a pressure at a junction between the branch flow path and the discharge-side main flow path.

In the present invention, it is preferable that a pressure at a junction between the branch flow path and the supply-side main flow path is higher than a pressure inside the power generation cell.

Further, it is also preferable that the relationship of (a pressure at a junction between the branch flow path and the supply-side main flow path)>(a pressure on an inlet side of the power generation cell)>(a pressure on an outlet side of the power generation cell)>(a pressure at a junction between the branch flow path and the discharge-side main flow path) is satisfied.

Further features of the present invention will become apparent from the following description of exemplary embodiments with reference to the attached drawings.

BRIEF DESCRIPTION OF THE DRAWINGS

FIG. 7 is a perspective view illustrating the structure of a fuel cell system according to Embodiment 3.

DESCRIPTION OF THE EMBODIMENTS

Figure 1:
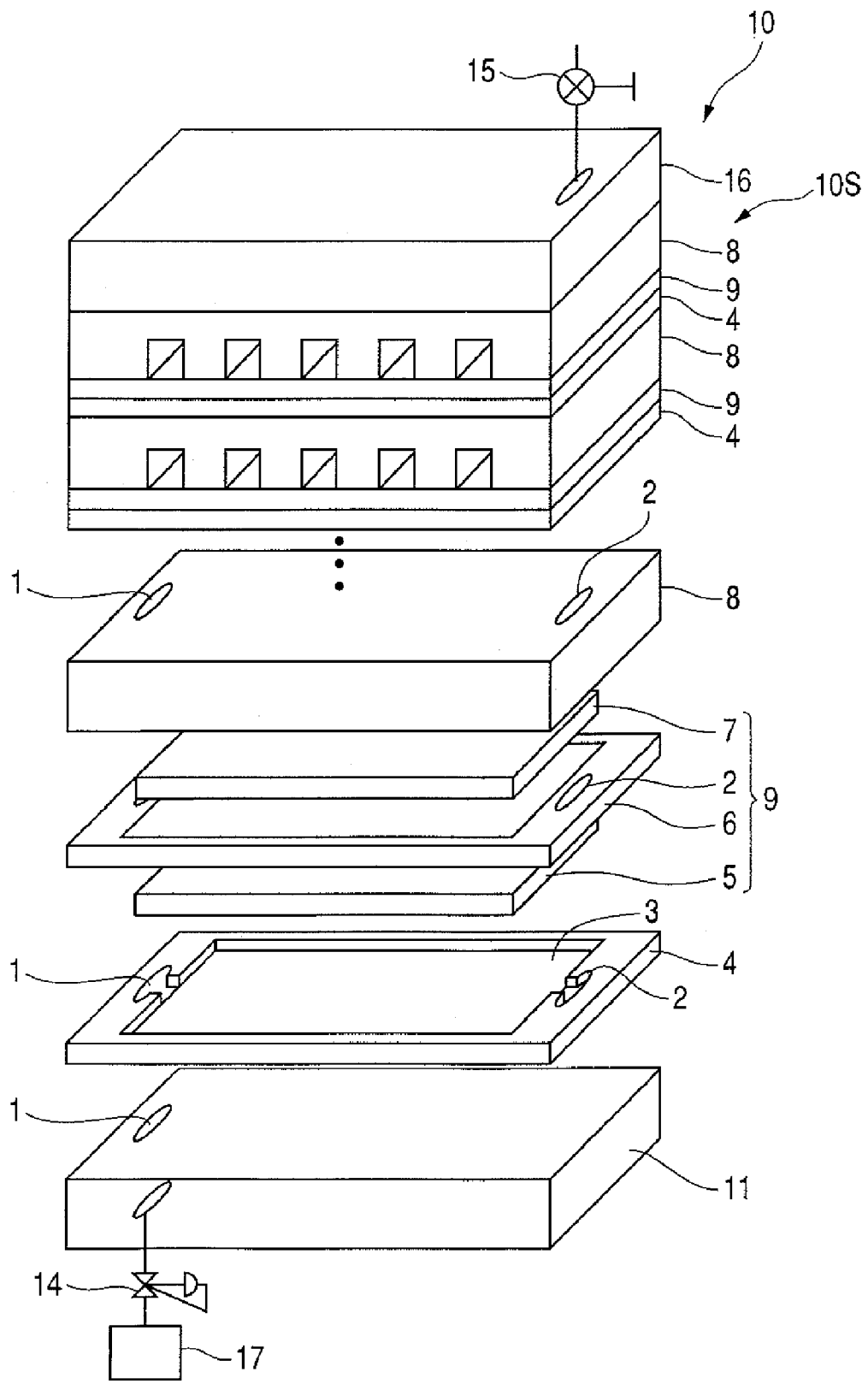
FIG. 1 is a perspective view illustrating the structure of a fuel cell system according to Embodiment 1.

According to the fuel cell system of the present invention, at a junction between a first branch flow path and a discharge-side main flow path, a flow path resistance obtained by summing a flow path resistance from a supply port to a junction between the first branch flow path and a supply-side main flow path and a flow path resistance from a junction between the first branch flow path and the supply-side main flow path to a junction between the first branch flow path and the discharge-side main flow path is smaller than a flow path resistance in a case where the flow passes through a branch flow path other than the first branch flow path from the supply port to a junction between the first branch flow path and the discharge-side main flow path.

Accordingly, first, during power generation in dead-ended mode, at a branch point with a branch flow path in the supply-side main flow path, the fuel gas flows into the power generation cell of the branch flow path without flowing into a different branch flow path. Further, at a junction with the discharge-side main flow path, since a pressure decrease caused by flow path resistance is larger for fuel gas that passed through a different branch flow path, it is difficult for the fuel gas to flow back to that branch flow path.

Furthermore, even in a case where the operating mode was switched to a purge operation from a power generation state, when hydrogen gas inside a plurality of power generation cells was discharged through the discharge-side main flow path, with respect to each of the branch flow paths, the following relation of (pressure at branch point with supply-side main flow path)>(pressure inside power generation cell)>(pressure at junction with discharge-side main flow path) is satisfied. Incidentally, the term "pressure of normal operation" herein employed refers to 1.1 to 2 atmospheric pressure (absolute pressure)

Accordingly, impurity gas that resides and accumulates in all of the power generation cells is smoothly and linearly pushed out to the discharge-side main flow path in a synchronized manner. Even in the case of a limited amount of low-pressure fuel gas, impurity gas can be efficiently discharged through the discharge-side main flow path without leaving a large amount of impurity gas in a part of a plurality of power generation cells. By uniformly removing impurity gas, hydrogen gas partial pressure can be uniformly secured in the plurality of power generation cells, thereby performing uniform power generation.

It is therefore possible to adequately exert the latent power generation capability of each power generation cell to achieve high power generation efficiency with little variation, so that the power generation performance of the overall fuel cell system is improved and stabilized.

Hereunder, a fuel cell system as one embodiment of the fuel cell system according to the present invention is described in detail with reference to the drawings. The fuel cell system according to the present invention is not limited to the limited configuration of the fuel cell system described hereunder, and as long as fuel gas is supplied to a plurality of power generation cells that branch from a supply-side main flow path, the fuel cell system can be implemented by a different embodiment in which a part or all of the configuration of the fuel cell system is replaced by an alternative configuration.

The fuel cell system according to the present invention can be implemented as an independent package or the like that is attachably/detachably mounted to a portable electronic device such as a digital camera, a digital camcorder, a small size projector, a small size printer, or a notebook personal computer. It can also be implemented in a form in which only a power generation part is integrally incorporated into an electronic device, and a fuel tank is attachably/detachably mounted thereto. Instead of a fuel tank, the supply of hydrogen gas may be generated utilizing a forming apparatus from a liquid fuel such as methanol, or another gas fuel or solid fuel.

Embodiment 1

Figure 2:
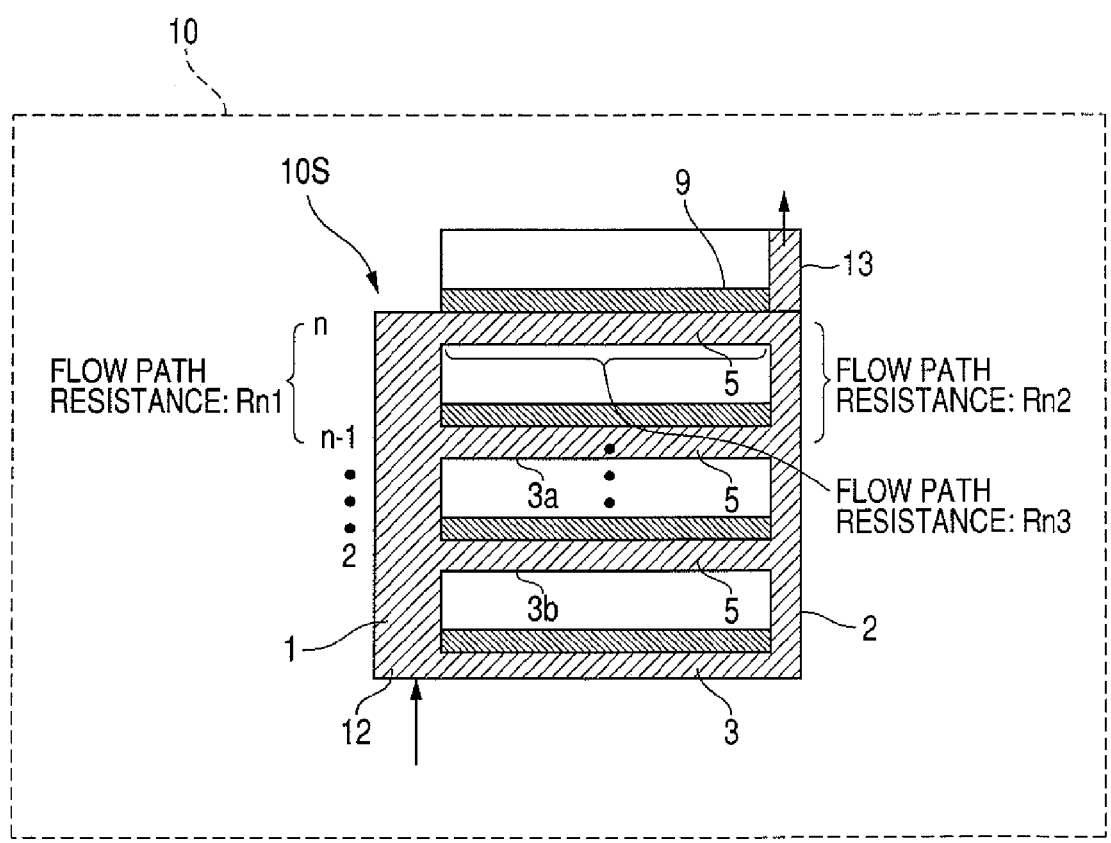
FIG. 2 is a schematic diagram of a flow path of hydrogen gas.
Figure 3:
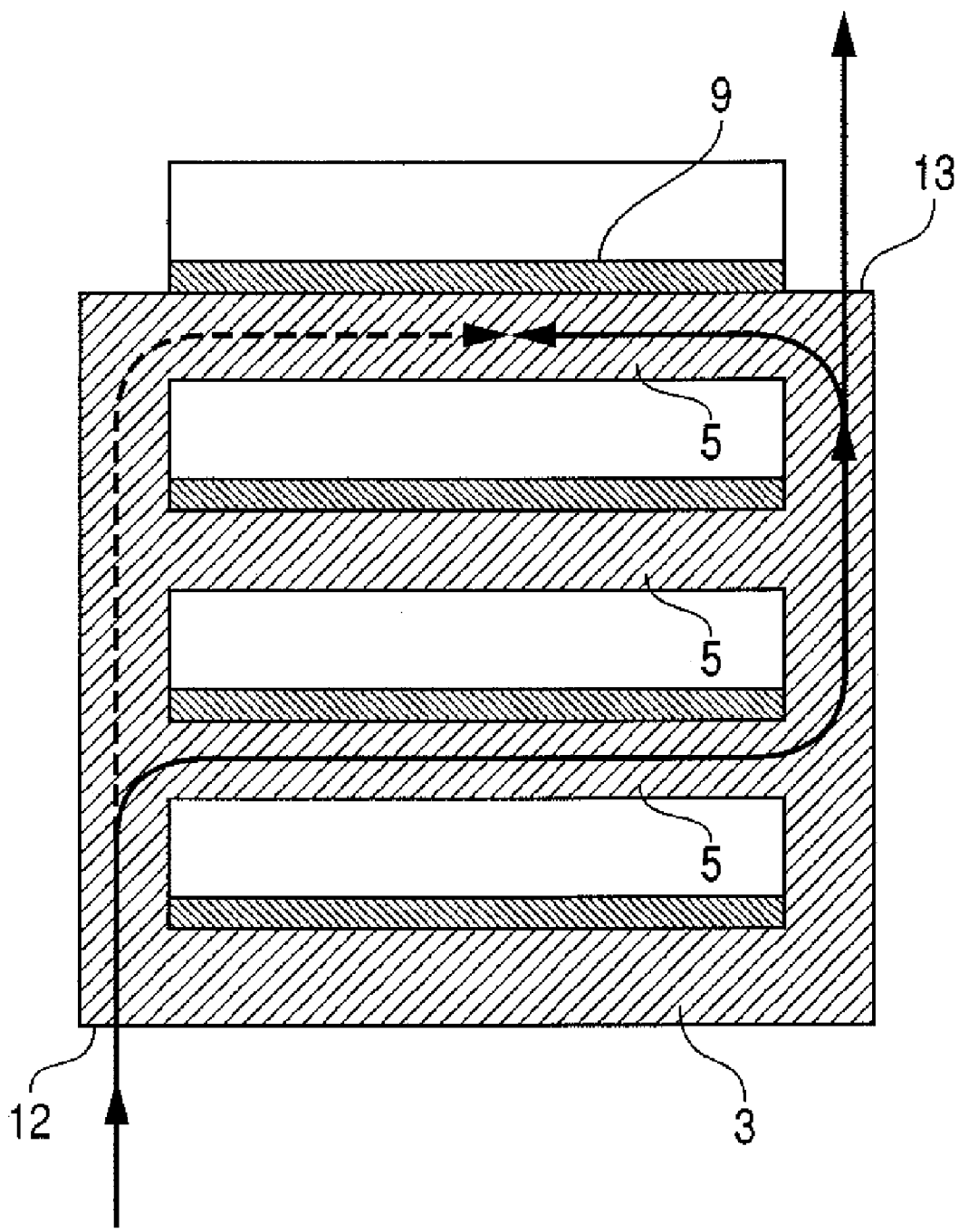
FIG. 3 is a diagram illustrating a case in which the discharge of impurity gas is not sufficient.
Figure 4:
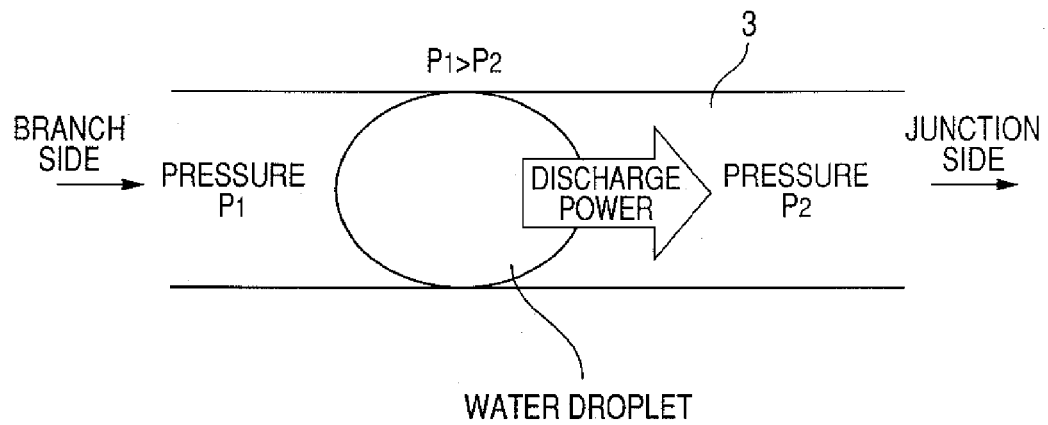
FIG. 4 is a diagram illustrating the discharge of a water droplet in a branch flow path.

FIG. 1 is a perspective view illustrating the structure of a fuel cell system according to Embodiment 1; FIG. 2 is a schematic diagram of a flow path of hydrogen gas; FIG. 3 is a diagram illustrating a case in which the discharge of impurity gas is not sufficient; and FIG. 4 is a diagram illustrating water droplet discharge in a branch flow path.

As shown in FIG. 1, a fuel cell system 10 according to Embodiment 1 comprises a cell stack 10S in which a plurality of power generation cells 9 are stacked and serially connected. The power generation cells 9 are stacked in a state in which they are each interposed between a fuel electrode current connector 4 and an oxidizer electrode current collector 8, and are assembled by restraining all of the components in the stacking direction using pressure plates 11 and 16.

The power generation cell 9 has a fuel diffusion electrode 5 contacted with one surface of a membrane electrode assembly 6 and an oxygen diffusion electrode 7 contacted with the other surface thereof. The membrane electrode assembly 6 is constituted by disposing catalyst layers on both sides of a polymer electrolyte membrane. At the catalyst layer that is in contact with the fuel diffusion electrode 5, hydrogen gas is decomposed into hydrogen atoms by a catalytic reaction and ionized, such that hydrogen ions are supplied to the polymer electrolyte membrane.

At the catalyst layer that is in contact with the oxygen diffusion electrode 7, as a result of a catalytic reaction, oxygen combines with hydrogen ions that have passed through the polymer electrolyte membrane of the power generation cell 9 to generate water molecules.

The polymer electrolyte membrane moves hydrogen ions from the fuel diffusion electrode 5 side to the oxygen diffusion electrode 7 side.

The fuel diffusion electrode 5 is disposed in a branch flow path 3 that is formed in the fuel electrode current connector 4. The circumference of the branch flow path 3 is sealed so that hydrogen gas does not leak to the surroundings. The oxygen diffusion electrode 7 is housed in a concavity that is formed in the oxidizer electrode current collector 8, and one part of a side thereof is open to the atmosphere via an opening in the oxidizer electrode current collector 8.

Through holes of the supply-side main flow path 1 are formed in conformity in a planar position with one another in the oxidizer electrode current collector 8, power generation cell 9 (membrane electrode assembly 6), and fuel electrode current connector 4 at each level as well as the pressure plate 11. A fuel tank 17 is connected via a pressure reducing valve 14 to an inlet (supply port) 12 of the supply-side main flow path 1 that is formed in a direction that passes through the cell stack 10S. Hydrogen gas that has been drawn out from the fuel tank 17 and subjected to pressure control at the pressure reducing valve 14 to obtain a pressure that is a little higher than atmospheric pressure is supplied to the supply-side main flow path 1, and branches at the fuel electrode current connector 4 of each level into the branch flow path 3 and flows into the fuel diffusion electrode 5 of that level.

Through holes of the discharge-side main flow path 2 are formed in conformity in a planar position with one another in pressure plate 16 and the oxidizer electrode current collector 8, power generation cell 9 (membrane electrode assembly 6), and fuel electrode current connector 4 at each level. A purge valve 15 that is normally closed and which is opened as needed is connected to an outlet (discharge port) 13 of the discharge-side main flow path 2 that is formed in a direction that passes through the cell stack 10S. During power generation, the supplied hydrogen is consumed in the power generation cells 9. Accordingly, in a state in which the purge valve 15 is closed, the pressure is lowest in the space of the fuel diffusion electrode 5.

The discharge-side main flow path 2 merges the branch flow path 3 of each level at the fuel electrode current connector 4 to guide the flow to the outlet 13, and when the purge valve 15 is opened, hydrogen gas that has purged the fuel diffusion electrode 5 of each level is discharged to the outside air via the purge valve 15.

The fuel diffusion electrode 5 is formed of a gas permeable, foamed metal plate. Since the fuel diffusion electrode 5 increases the flow path resistance of the branch flow path 3 of each level, the flow path resistance of the branch flow path 3 is significantly larger than the supply-side main flow path 1 and the discharge-side main flow path 2 that are through holes.

The supply-side main flow path 1 and the discharge-side main flow path 2 are disposed at planar positions that sandwich the fuel diffusion electrode 5 on opposite sides thereof. Hydrogen gas that has flowed into the branch flow path 3 from the supply-side main flow path 1 is diffused through the fuel diffusion electrode 5 from one side toward the opposite side, thereby purging the fuel diffusion electrode 5 in one direction. Since the flow path resistance of the branch flow path 3 is large, hydrogen gas branches into the branch flow paths 3 of the respective levels at small pressure differences from the supply-side main flow path 1 that has a small flow path resistance to thereby purge the fuel diffusion electrode 5 of each level in a synchronized manner. The branch flow path 3 of each level that has a large flow path resistance allows the hydrogen gas that has purged the fuel diffusion electrode 5 to flow together at small pressure differences into the discharge-side main flow path 2 that has a small flow path resistance.

Incidentally, when opening the purge valve 15 to purge the fuel diffusion electrode 5, it is desirable to perform the purge in a state in which the load is disconnected from the fuel cell system 10 and the electrical current output is stopped (or reduced). This is because if hydrogen gas that corresponds to the electrical current output moves to the oxygen diffusion electrode 7 side through the membrane electrode assembly 6, the hydrogen gas that contributes to purging impurity gas and flows into the discharge-side main flow path 2 will be decreased. However, in order to simplify the control, it is also possible to conduct the purge while generating power.

As shown in FIG. 2, hydrogen gas that has been supplied from the inlet 12 to the cell stack 10S of the fuel cell 10 branches to the branch flow paths 3 (N paths in total) of the respective levels from the supply-side main flow path 1 to be thereby supplied to the power generation cells 9 of the respective levels. The branch flow paths 3 again merge toward the discharge-side main flow path 2 downstream of the power generation cell 9 to be led to the outlet 13.

In this case, the branch flow paths 3 are numbered 1, 2, 3 . . . N starting from the side near the inlet 12. The flow path resistance from a branch to the (n−1)th branch flow path 3 to a branch to the $n^{th}$ branch flow path 3 in the supply-side main flow path 1 is represented by $R_{n1}$. Further, the flow path resistance from a branch to the (n−1)th branch flow path 3 to a branch to the $n^{th}$ branch flow path 3 in the discharge-side main flow path 2 is represented by $R_{n2}$, and the flow path resistance of the nth branch flow path is represented by $R_{n3}$. Here, it is assumed that $R_{11}=0$ and $R_{12}=0$.

According to the fuel cell of this embodiment, with respect to each of the branch flow paths, the magnitude of a flow path resistance obtained by summing a flow path resistance from the supply port 12 to a junction between the supply-side main flow path 1 and a first branch flow path 3a and a flow path resistance from a junction between the first branch flow path 3a and the supply-side main flow path 2 to a junction between the first branch flow path 3a and the discharge-side main flow path 2 is less than the magnitude of a flow path resistance obtained by summing a flow path resistance from the supply port 12 to a junction of the supply-side main flow path 2 with a second branch flow path 3b that is different from the first branch flow path 3a, a flow path resistance from a junction of the second branch flow path 3b with the supply-side main flow path 1 to a junction between the second branch flow path 3b and the discharge-side main flow path 2, and a flow path resistance from a junction between the second branch flow path 3b and the discharge-side main flow path 2 to a junction between the first branch flow path 3a and the discharge-side main flow path 2. Incidentally, as long as the first branch flow path 3a and the second branch flow path 3b are not identical to each other, they may be any one of the branch flow paths of the fuel cell.

In this case, the flow path resistance $R_n$ is represented as follows.

$$R_n = \sum_{k=1}^{n} R_{k1} + R_{n3}$$

Normally, it is preferred that during power generation, the hydrogen supply to the fuel diffusion electrode 5 is performed from the supply-side main flow path 1 to the branch flow path 3. However, when the flow path resistance of the discharge-side main flow path 2 is extremely small in comparison to that of the supply-side main flow path 1, the proportion of hydrogen that passes through another branch flow path and the discharge-side main flow path to be supplied to the fuel diffusion electrode 5 increases. There are many cases where hydrogen gas that passed through another fuel cell 9 contains much impurity generated accompanying power generation, which cause variations in the power generation. In a case where this kind of flow path design is not carried out and a different branch flow path 3 exists with a flow path resistance $R_n$ which is smaller than that when passing through that branch flow path 3, when performing power generation, or when a purge is carried out during power generation and the purge flow rate is less than the hydrogen amount that is consumed by power generation, as shown in FIG. 3, the proportion of hydrogen gas that passes through a different power generation cell 9 and turns around from the side of a junction with the discharge-side main flow path 2 to be supplied to the fuel diffusion electrode 5 increases. Further, even when performing a purge after stopping power generation, the purge must be performed against the reverse flow generated during power generation. Such a state is not preferable as the circulation of the hydrogen gas becomes unstable. However, since a deviation will occur in the flow if the flow path resistance $R_n$ is made excessively smaller than those of the other paths, it is also important not to make $R_n$ too small.

As the method of designing the flow path resistance $R_n$, in addition to designing the width or length of the branch flow path 3 and the sectional form of the supply-side main flow path 1, it is also possible to design the flow path resistance by inserting a throttle structure in the branch flow path 3 (particularly the discharge-side main flow path 2 side). A method also exists in which a resistance member such as a porous member is inserted therein. Further, it is also effective to alter the surface roughness or wettability of the branch flow path 3.

In the fuel cell system 10 of Embodiment 1, the flow paths are designed such that, for each branch flow path 3, the sum of the flow path resistance from the inlet 12 to the inlet (branch point) of the branch flow path 3 and the flow path resistance $R_{n3}$ of the branch flow path 3 is greater than the flow path resistance from a branch point with the supply-side main flow path 1 to the inlet 12 in any of the other branch flow paths 3.

$$\sum_{k=1}^{n} R_{k1} + R_{n3} > \sum_{k=1}^{m} R_{k1}$$

(provided $n < m$)

By designing the flow path resistance in this manner, even when the distance from the inlet 12 to a branch point of the branch flow path 3 and the supply-side main flow path 1 differs depending on the power generation cell, hydrogen gas can be branched and supplied to each branch flow path at small pressure differences to thereby reduce variations in power generation performance and to enable alleviation of deviations in the gas flow when performing a purge.

Further, when the flow path resistance from a branch point with the supply-side main flow path 1 to the inlet 12 for a specific branch flow path 3 is less than the flow path resistance through a different branch flow path 3 from the inlet 12 to a junction with the discharge-side main flow path 2, there is a possibility that the inflow of hydrogen gas into that specific branch flow path 3 may be hindered and that hydrogen gas that has passed through the different branch flow path 3 may flow into the specific branch flow path 3 from the junction side. That is, for the specific branch flow path 3, there is a possibility that hydrogen gas may flow back as illustrated in FIG. 3.

By combining these two designs, the mechanism for rectifying the flow of hydrogen gas becomes more effective, enabling the elimination of backflows and the uniform supply of hydrogen gas to each power generation cell 9.

According to the fuel cell system 10 of Embodiment 1, for each branch flow path 3, the flow path resistance $R_{n3}$ thereof is sufficiently larger than each of the flow path resistance of the supply-side main flow path 1 and the flow path resistance of the discharge-side main flow path 2. The flow path resistance $R_{n3}$ of the branch flow path 3 is designed to be greater than each of the flow path resistance of the supply-side main flow path 1 from the inlet 12 to the branch point with the branch flow path 3 and the flow path resistance of the discharge-side main flow path 2 from the outlet 13 to the junction with the branch flow path 3.

$$\sum_{k=1}^{n} R_{k1} < R_{n3}, \sum_{k=n+1}^{N} R_{k2} < R_{n3}$$

(provided n<N)

Thus, as shown in FIG. 4, when a water droplet is produced in the branch flow path 3 by flooding or the like, a differential pressure is liable to be produced between the front and rear of the water droplet such that the pressure on the outlet side decreases, and the water droplet can be efficiently discharged to the discharge-side main flow path 3 by employing this differential pressure as a driving force.

Further, during power generation, on the downstream side of the fuel diffusion electrode 5, since hydrogen gas is consumed in the power generation cells 9, the hydrogen gas flow rate is less than that on the upstream side of the fuel diffusion electrode 5. It is therefore preferable to estimate the flow path resistance by taking into consideration the consumption amount of hydrogen gas, and also to estimate the flow path resistance of the discharge-side main flow path 2 somewhat larger.

According to the fuel cell system 10 of Embodiment 1, the flow path resistance through the respective branch flow paths 3 from the inlet 12 to the respective junctions is designed such that when hydrogen gas is supplied from the inlet 12 under the normal conditions (from the fuel tank 17 shown in FIG. 1), the pressure within the power generation cells 9 is higher than the pressure at the respective junctions. In other words, even in the case of a small quantity of low-pressure hydrogen gas, the following relation is valid for all of the branch flow paths 3: pressure of supply-side main flow path 1>pressure on inlet side of power generation cell 9>pressure on outlet side of power generation cell 9>pressure at position in front of junction>pressure of discharge-side main flow path 2. Thus, impurity gas that resides/accumulates in all of the power generation cells 9 is smoothly and linearly pushed out to the discharge-side main flow path 2 in a synchronized manner.

Embodiment 1 is a so-called dead-ended fuel cell system that does not have a mechanism for hydrogen gas recirculation, in which the purge valve 15 is opened when removing impurity gas that resides/accumulates in the power generation cells 9.

Accordingly, in a normal power generation state the purge valve 15 is closed and the pressure is lowest in the space of the fuel diffusion electrode 5 that is in contact with the membrane electrode assembly 6 as a power generating section. At the power generation cell 9 in which the pressure is lowest of the power generation cells 9 of each level, there is a possibility that hydrogen gas may flow back from the junction side through the discharge-side main flow path 2 from a different power generation cell 9. However, by means of the design of the optimized flow path resistance as described above, pressure differences between the power generation cells 9 are entirely offset by movement of hydrogen gas through the supply-side main flow path 1, thereby effectively reducing backward flows from the junction side.

Further, regarding a purge operation, the outlet 13 for a purge may be considered as a flow path outlet, and by means of the flow path resistance design as described above a purge can be performed more effectively and impurity gas or water droplets can be prevented from accumulating at one area in the flow path.

In particular, by incorporating a throttle structure into a branch flow path 3 on a downstream side of the power generation cell 9, it is possible to effectively prevent a phenomenon in which hydrogen gas flows back from the junction side through the discharge-side main flow path 2, and even in a case where the supplied hydrogen pressure when performing a purge is not so much higher than that of the outside air, it is possible to effectively prevent contamination with the outside air due to back diffusion at the time of a purge.

Incidentally, the conditions of the flow path configuration of the present embodiment are also applicable to power generation in a state in which hydrogen is flowed in trace amounts, not in a dead-ended mode.

Embodiment 2

Figure 5:
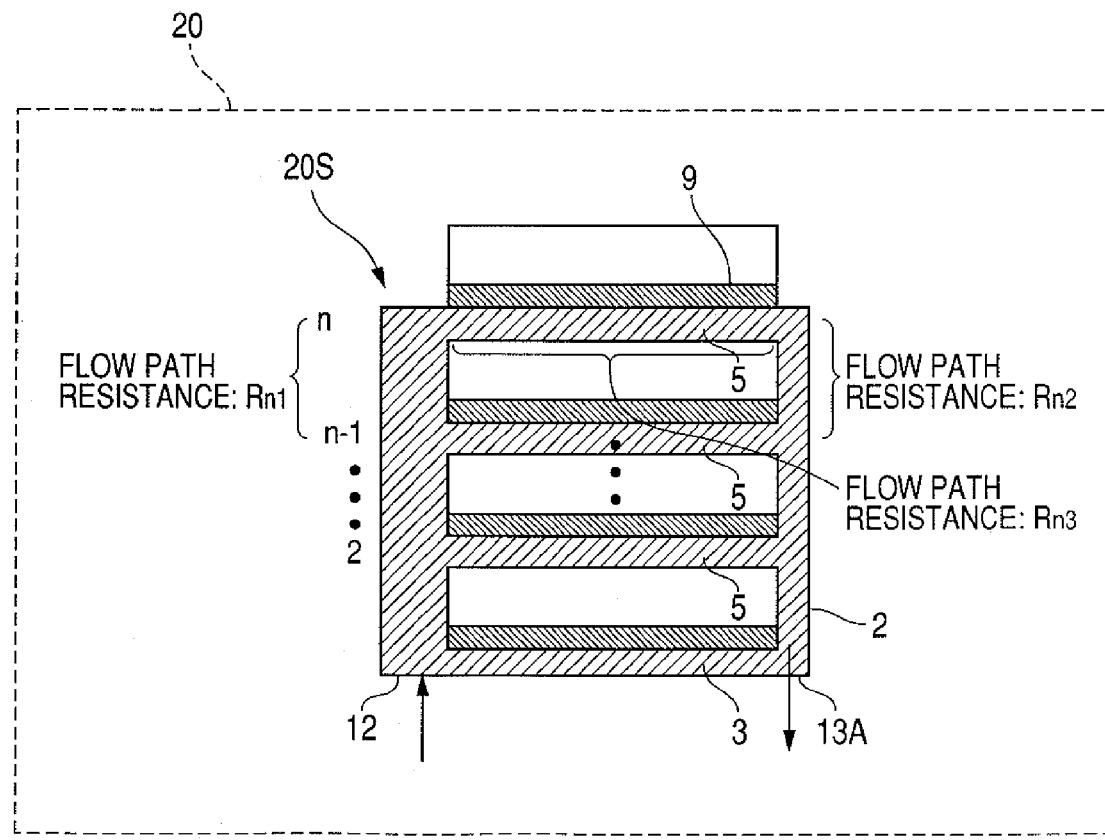
FIG. 5 is a schematic diagram of a flow path of hydrogen gas in a fuel cell system 20 according to Embodiment 2.
Figure 6:
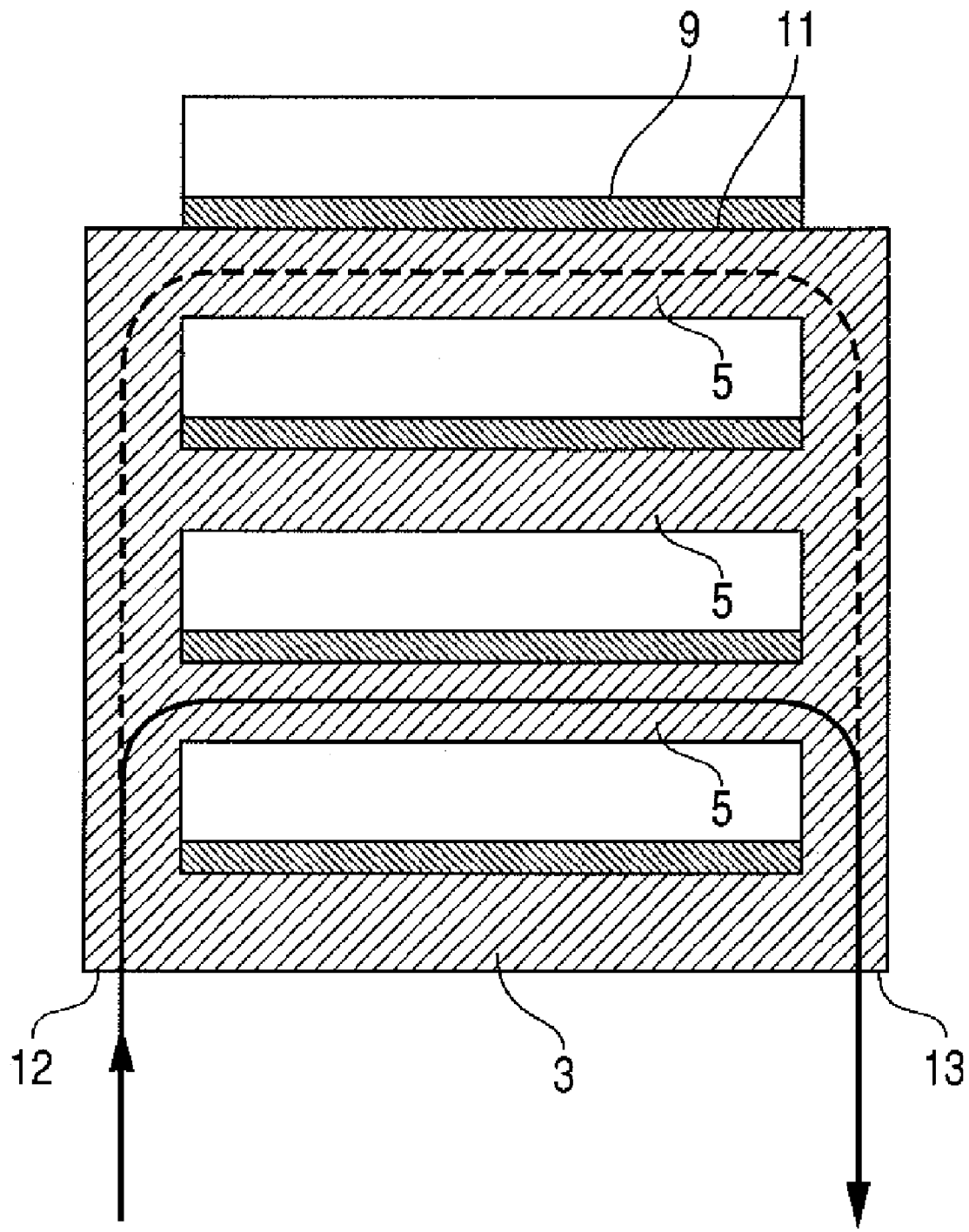
FIG. 6 is a diagram illustrating a case in which the discharge of impurity gas is not sufficient.

FIG. 5 is a schematic diagram of a flow path of hydrogen gas in a fuel cell system 20 according to Embodiment 2, and FIG. 6 is a diagram illustrating a case in which the discharge of impurity gas is not sufficient. The fuel cell system 20 according to Embodiment 2 is configured in the same manner as in Embodiment 1 with the exception that the position of the outlet 13 in Embodiment 1 is changed to the same side (lower side) as the inlet 12. Accordingly, the elements which are the same as those shown in FIGS. 1 and 2 are identified by like numerals or symbols, and a detailed description thereof is omitted.

In the fuel cell system 20 of Embodiment 2, a through hole of the discharge-side main flow path 2 is formed in the pressure plate 11 shown in FIG. 1 to form an outlet 13A as shown in FIG. 5, and the purge valve 15 is connected to the discharge-side main flow path 2 (outlet 13A) of the pressure plate 11. Thereby, the structure that protrudes upward from the pressure plate 16 is eliminated, and this is advantageous with respect to size reduction of the fuel cell system 20.

As shown in FIG. 6, the inlet 12 for introducing hydrogen gas into a cell stack 20S and the outlet 13A for purging are disposed on the same side of the fuel cell system 20. Thereby, the flow direction of the hydrogen gas along the supply-side main flow path 1 and the flow direction of the hydrogen gas along the discharge-side main flow path 2 are opposite to each other.

Similarly to Embodiment 1, in the fuel cell system 20 according to Embodiment 2, the flow path resistances of the supply-side main flow path 1, the discharge-side main flow path 2, and the branch flow paths 3 of each level are designed as follows:

(1) For each branch flow path 3, the flow path resistance $R_n$ from the inlet 12 to a junction with the discharge-side main flow path 2 is smallest in a case where the flow passed through that branch flow path 3.

(2) For each branch flow path 3, the sum of the flow path resistance from the inlet 12 to the inlet (branch point) of the branch flow path 3 and the flow path resistance $R_{n3}$ of the branch flow path 3 is larger than the flow path resistance from a branch point with the supply-side main flow path 1 to the inlet 12 in any of the other branch flow paths 3.

(3) For each branch flow path 3, the flow path resistance $R_{n3}$ of the branch flow path 3 is sufficiently larger than each of the flow path resistance of the supply-side main flow path 1 from the inlet 12 to the branch point to the branch flow path 3 and the flow path resistance of the discharge-side main flow path 2 from the outlet 13A to a junction with the branch flow path 3.

(4) The flow path resistance to the outlet 13A from the inlet 12 through the branch flow path 3 is set such that, when hydrogen gas is supplied from the fuel tank 17 and the purge valve 15 is opened, the pressure within each of the power generation cells 9 becomes higher than the pressure at junctions with the respective branch flow path 3 thereof.

When providing the outlet 13A at a position, as shown in FIG. 5, that is not diagonal to the inlet 12 with respect to the cell stack 20S, as shown in FIG. 6, hydrogen gas is supplied in a manner that centers on the power generation cells 9 near the inlet 12. As a result, it becomes difficult to supply hydrogen gas to power generation cells 9 that are distant from the inlet 12 and, as shown in FIG. 6, the possibility that the power generation cells 9 will be unevenly purged increases.

Thus, by increasing the flow path resistance in accordance with the nearness of the branch flow path to the inlet 12, it is possible to alleviate the unevenness. More specifically, the flow path resistance is designed such that $R_{n3} > R_{m3}$ (n<m). In particular, by making $R_{n3} + R_{n1} + R_{n2}$ approximately identical to $R_{(n-1)3}$, the flow path resistance can be made more uniform.

Further, by implementing the design as described in (1) to (4) above, a phenomenon in which hydrogen gas flows back from the junction side through the discharge-side main flow path 2 during power generation in dead-ended mode can be effectively reduced, and an equal hydrogen gas flow rate can be secured in the power generation cells 9 to enable a uniform purge to be performed.

Embodiment 3

Figure 8A:
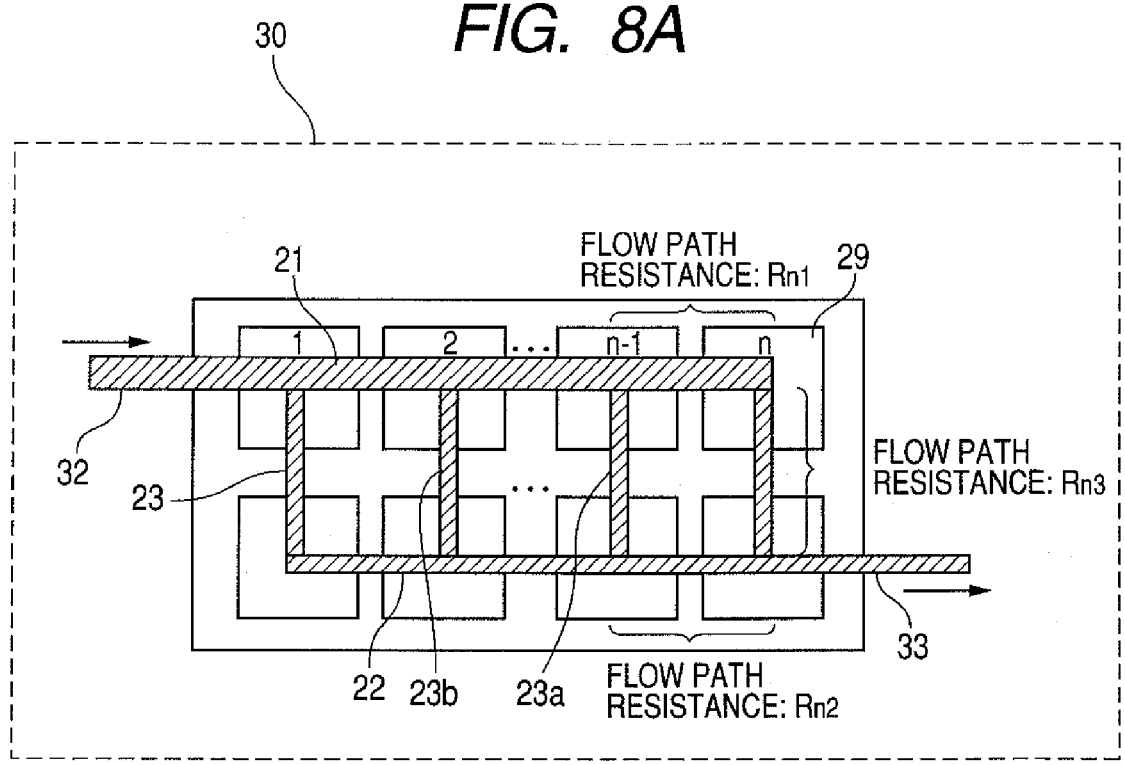
FIGS. 8A and 8B are schematic diagrams of a flow path of hydrogen gas.
Figure 8B:
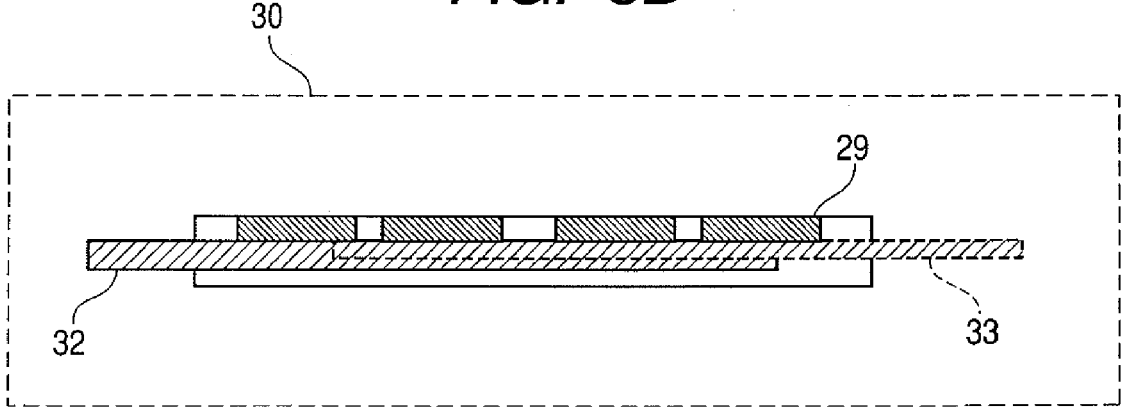
Figure 9:
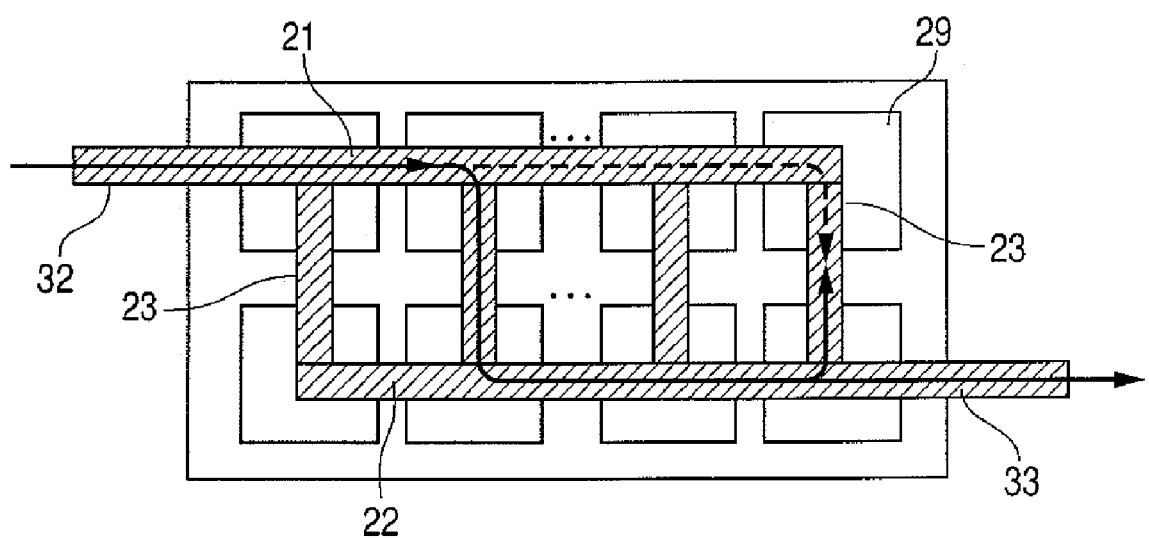
FIG. 9 is a diagram illustrating a case in which the discharge of impurity gas is not sufficient.

FIG. 7 is a perspective view illustrating the structure of a fuel cell system according to Embodiment 3, FIGS. 8A and 8B are schematic diagrams of a flow path of hydrogen gas, and FIG. 9 is a diagram illustrating a case in which the discharge of impurity gas is not sufficient. In the fuel cell system 30 according to Embodiment 3, the structure of the present invention is applied to a planar array fuel cell.

As shown in FIG. 7, a plurality of power generation cells 29 that are two-dimensionally arrayed are connected in parallel by a common fuel electrode current connector 24 and oxidizer electrode current collector 28 to extract the electrical power thereof in parallel. The power generation cell 29 has a fuel diffusion electrode 25 contacted with one surface of a membrane electrode assembly 26 and an oxygen diffusion electrode 27 contacted with the other surface thereof. The membrane electrode assembly 26 is constituted by disposing catalyst layers on both sides of a polymer electrolyte membrane.

The fuel diffusion electrode 25 and the oxygen diffusion electrode 27 are each housed in independent openings of a fuel electrode spacer 37 and an oxidizer electrode spacer 38. The fuel electrode spacer 37 and oxidizer electrode spacer 38 are assembled by insertion in the space between the fuel electrode current connector 24 and the oxidizer electrode current collector 28 together with the power generation cell 29.

In the fuel electrode current connector 24 and the oxidizer electrode current collector 28, an electrically-conductive porous material is independently arranged for each power generation cell 29, such that hydrogen gas and oxygen are not diffused, respectively, between neighboring power generation cells 29. Supply of hydrogen gas to the power generation cell 29 is performed through a flow path substrate 36 that is disposed on the under surface of the fuel electrode current connector 24. A space enclosed by the partition frames of the fuel electrode spacer 37 and the fuel electrode current connector 24, the membrane electrode assembly 26, and the flow path substrate 36 is a fuel space that houses the fuel diffusion electrode 25 and is sealed from outside air.

The oxygen diffusion electrode 27 is housed in the partition frame of the oxidizer electrode spacer 38, and the surface thereof is open to the atmosphere through the oxidizer electrode current collector 28. In the fuel cell system according to Embodiment 3, since the power generation cells 29 are two-dimensionally arrayed, the oxygen intake area and water vapor discharge area can be secured in a wider manner in comparison to the stacked form of Embodiment 1.

In the flow path substrate 36, a plurality of branch flow paths 23 are formed that guide hydrogen gas to two of the power generation cells 29, respectively. Those branch flow paths 23 at portions that are in contact with the fuel electrode current connector 24 are each formed in a shallow shape to increase flow path resistance thereof, so that hydrogen gas does not pass straight through without diffusing into the fuel electrode current connector 24.

On the flow path substrate 36, the plurality of branch flow paths 23 each connect at both ends thereof to a supply-side main flow path 21 and a discharge-side main flow path 22. Similarly to Embodiment 1, an inlet 32 of the supply-side main flow path 21 is connected to the fuel tank 17 through the pressure reducing valve 14, and an outlet 33 of the discharge-side main flow path 22 is connected to the purge valve 15.

Hydrogen gas that was subjected to pressure control at the pressure reducing valve 14 to obtain a pressure that is a little higher than atmospheric pressure is supplied to the supply-side main flow path 21 from the fuel tank 17, and branches into the branch flow path 23 to flow into the fuel diffusion electrode 25 from the fuel electrode current connector 24.

At the catalyst layer of the membrane electrode assembly 29 that is in contact with the fuel diffusion electrode 25, hydrogen gas is decomposed into hydrogen atoms by a catalytic reaction and ionized, so that hydrogen ions are supplied to the polymer electrolyte membrane. At the catalyst layer of the membrane electrode assembly 29 that is in contact with the oxygen diffusion electrode 27, as a result of a catalytic reaction, oxygen combines with hydrogen ions that are picked up from the polymer electrolyte membrane to generate water molecules. The polymer electrolyte membrane of the membrane electrode assembly 29 moves hydrogen ions from the fuel diffusion electrode 25 side to the oxygen diffusion electrode 27 side. During power generation, the supplied hydrogen is consumed in the power generation cells 29. Accordingly, in a state in which the purge valve 15 is closed, the pressure is lowest in the space of the fuel diffusion electrode 25.

The purge valve 15 is normally closed and is opened as needed. The discharge-side main flow path 22 merges the plurality of branch flow paths 23 to guide the flow to the outlet 33, when the purge valve 15 is opened, hydrogen gas that has purged the fuel diffusion electrode 25 is discharged into the outside air via the purge valve 15.

As shown in FIGS. 8A and 8B, hydrogen gas that was supplied from the inlet 32 to the fuel cell system 30 passes through the supply-side main flow path 21 and is supplied to the power generation cells 29 while branching at the branch flow paths 23. The branch flow paths 23 from the power generation cells 29 merge again at the discharge-side main flow path 22 and pass through the discharge-side main flow path 22 to be led to the outlet 33.

In this case, the branch flow paths 23 are numbered 1, 2, 3 . . . N from the side near the inlet 32. The flow path resistance from a branch to the (n−1)th branch flow path 23 to a branch to the $n^{th}$ branch flow path 23 in the supply-side main flow path 21 is taken as $R_{n1}$. Further, the flow path resistance from a branch to the (n−1)th branch flow path 23 to a branch to the $n^{th}$ branch flow path 23 in the discharge-side main flow path 22 is taken as $R_{n2}$, and the flow path resistance of the $n^{th}$ branch flow path is taken as $R_{n3}$. Here, it is assumed that $R_{11}=0$ and $R_{12}=0$.

According to the fuel cell system 30 of Embodiment 3, in each of the branch flow paths 23, the magnitude of a flow path resistance obtained by summing the flow path resistance from the inlet 32 to a junction between the supply-side main flow path 21 and a first branch flow path 23a and the flow path resistance from the junction between the first branch flow path 23a and the supply-side main flow path 21 to a junction between the first branch flow path 23a and the discharge-side main flow path 22 is less than the magnitude of a flow path resistance obtained by summing the flow path resistance from the inlet 32 to a junction of the supply-side main flow path 21 with a second branch flow path 23b that is different from the first branch flow path 23a, the flow path resistance from the junction between the second branch flow path 23b and the supply-side main flow path 21 to a junction between the second branch flow path 23b and the discharge-side main flow path 22, and the flow path resistance from the junction between the second branch flow path 23b and the discharge-side main flow path 22 to the junction between the first branch flow path 23a and the discharge-side main flow path 22. Incidentally, as long as the first branch flow path 23a and the second branch flow path 23b are not identical to each other, they may be any one of the branch flow paths of the fuel cell.

At this time, the flow path resistance $R_n$ is represented by:

$$R_n = \sum_{k=1}^{n} R_{k1} + R_{n3}.$$

Normally, it is preferred that during power generation, the hydrogen supply to the fuel diffusion electrode 25 is performed from the supply-side main flow path 21 to the branch flow path 23. However, when the flow path resistance of the discharge-side main flow path 22 is extremely small in comparison to that of the supply-side main flow path 21, the proportion of hydrogen that passes through another branch flow path as a detour and through the discharge-side main flow path to be supplied increases. There are many cases where hydrogen gas that passed through another fuel cell 29 as a detour contains much impurity generated accompanying power generation, which cause variations in the power generation. In a case where this kind of flow path design is not carried out and a different branch flow path 23 exists with a flow path resistance $R_n$ which is smaller than that when passing through that branch flow path 23, when performing power generation, or when a purge is carried out during power generation and the purge flow rate is less than the hydrogen amount that is consumed by power generation, as shown in FIG. 9, the proportion of hydrogen gas that passes through a different branch flow path 23 as a detour and turns around from the side of a junction with the discharge-side main flow path 22 to be supplied to the fuel diffusion electrode 25 increases. Further, even when performing a purge after stopping power generation, the purge must be performed against the reverse flow generated during power generation. Such a state is not preferable as the circulation of the hydrogen gas becomes unstable. However, since a deviation will occur in the flow if the flow path resistance $R_n$ is made excessively smaller than those of the other paths, it is also important not to make $R_n$ too small.

As the method of designing the flow path resistance $R_{n3}$, in addition to designing the width or length of the branch flow path 23 and the sectional form of the supply-side main flow path 21, it is also possible to design the flow path resistance by inserting a throttle structure in the branch flow path 23 (particularly the discharge-side main flow path 22 side). A method also exists in which a resistance member such as a porous member is inserted therein. Further, it is also effective to alter the surface roughness or wettability of the branch flow path 23.

In the fuel cell system 30 of Embodiment 3, the flow paths are designed such that, for each branch flow path 23, the sum of the flow path resistance from the inlet 32 to the branch point of the branch flow path 23 and the flow path resistance $R_{n3}$ of the branch flow path 23 is greater than the flow path resistance from a branch point with the supply-side main flow path 21 to the inlet 32 in any of the other branch flow paths 23.

$$\sum_{k=1}^{n} R_{k1} + R_{n3} > \sum_{k=1}^{m} R_{k1}$$

(provided $n < m$)

By designing the flow path resistance in this manner, even when the distance from the inlet 32 to a branch point of the supply-side main flow path 21 and the branch flow path 23 differs depending on the power generation cell, hydrogen gas can be branched and supplied to each branch flow path at small pressure differences to thereby reduce variations in power generation performance and to enable alleviation of deviations in the gas flow when performing a purge.

Further, when the flow path resistance from a branch point with the supply-side main flow path 21 to the inlet 32 for a specific branch flow path 23 is less than the flow path resistance through a different branch flow path 23 from the inlet 32 to a junction with the discharge-side main flow path 22, there is a possibility that the inflow of hydrogen gas into that specific branch flow path 23 may be hindered and that hydrogen gas that has passed through the different branch flow path 23 may flow into the specific branch flow path 23 from the junction side. That is, for the specific branch flow path 23, there is a possibility that hydrogen gas may flow back as illustrated in FIG. 9.

By combining these two designs, the mechanism for rectifying the flow of hydrogen gas becomes more effective, enabling the elimination of backflows and the uniform supply of hydrogen gas to the plurality of power generation cells 29.

According to the fuel cell system 30 of Embodiment 3, for each branch flow path 23, the flow path resistance $R_{n3}$ thereof is sufficiently larger than each of the flow path resistance of the supply-side main flow path 21 and the flow path resistance of the discharge-side main flow path 22. The flow path resistance $R_{n3}$ of the branch flow path 23 is designed to be greater than each of the flow path resistance of the supply-side main flow path 21 from the inlet 32 to the branch point with the branch flow path 23 and the flow path resistance of the discharge-side main flow path 22 from the outlet 33 to the junction with the branch flow path 23.

$$\sum_{k=1}^{n} R_{k1} < R_{n3}, \sum_{k=n+1}^{N} R_{k2} < R_{n3}$$

(provided n<N)

Thus, as shown in FIG. 4, when a water droplet is generated in the branch flow path 23 by flooding or the like, a differential pressure is liable to be produced between the front and rear of the water droplet such that the pressure on the outlet side decreases, and the water droplet can be efficiently discharged to the discharge-side main flow path 22 by employing this differential pressure as a driving force.

Further, during power generation, at portions in front of points where the branch flow paths 23 merge with the discharge-side main flow path 22, since hydrogen gas is consumed in the power generation cells 29, the hydrogen gas flow rate is less than that at portions located on the upstream side of the fuel diffusion electrodes 25. It is therefore preferable to estimate the flow path resistance by taking into consideration the consumption amount of hydrogen gas, and also to estimate the flow path resistance of the discharge-side main flow path 22 somewhat larger.

According to the fuel cell system 30 of Embodiment 3, the flow path resistance through the respective branch flow paths 23 from the inlet 32 to each junction is designed such that when hydrogen gas is supplied from the fuel tank 17, the pressure within the power generation cells 29 is higher than the pressure at the respective junctions. Thus, impurity gas that resides/accumulates in all of the power generation cells 29 is smoothly and linearly pushed out to the discharge-side main flow path 22 in a synchronized manner.

The fuel cell system 30 according to Embodiment 3 is a dead-ended fuel cell in which normally the purge valve 15 is closed and hydrogen gas is supplied from the fuel tank 17. Accordingly, at the time of power generation, the power generating portion, i.e. the fuel diffusion electrode 25, has the highest negative pressure, and there is a possibility that hydrogen gas may flow into the branch flow paths 23 from both the supply-side main flow path 21 side and the discharge-side main flow path 22 side.

However, by means of the flow path resistance design as described above, hydrogen gas can be introduced into the power generation cell 29 entirely from the supply-side main flow path 21 side, and backward flows from the discharge-side main flow path 22 can be reduced. Further, regarding a purge operation, the outlet 33 for purging may be considered as a flow path outlet, and by means of the above described flow path resistance design, a purge can be performed more effectively and residence of impurity gas or water droplets at a portion of the flow path can be prevented. In particular, by incorporating a throttle structure at a position near a junction between the branch flow path 23 and the discharge-side main flow path 22, it is possible to prevent outside air entering the power generation cell 29 due to back diffusion at the time of a purge, even in a case where the supplied hydrogen pressure when performing a purge is not so much higher than that of the outside air.

Incidentally, the conditions of the flow path configuration of the present embodiment are also applicable to power generation in a state in which hydrogen is flowed at a small flow rate, not in a dead-ended mode.

Embodiment 4

Figure 10:
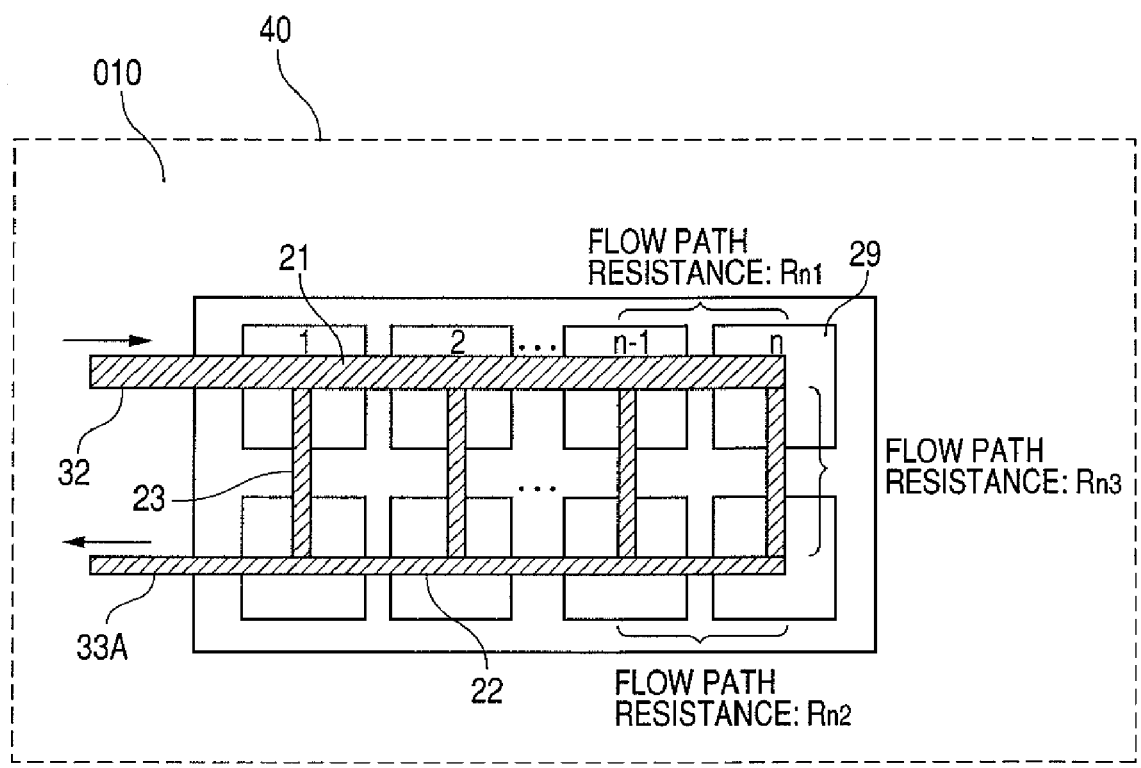
FIG. 10 is a schematic diagram of a flow path of hydrogen gas in a fuel cell system 40 according to Embodiment 4.
Figure 11:
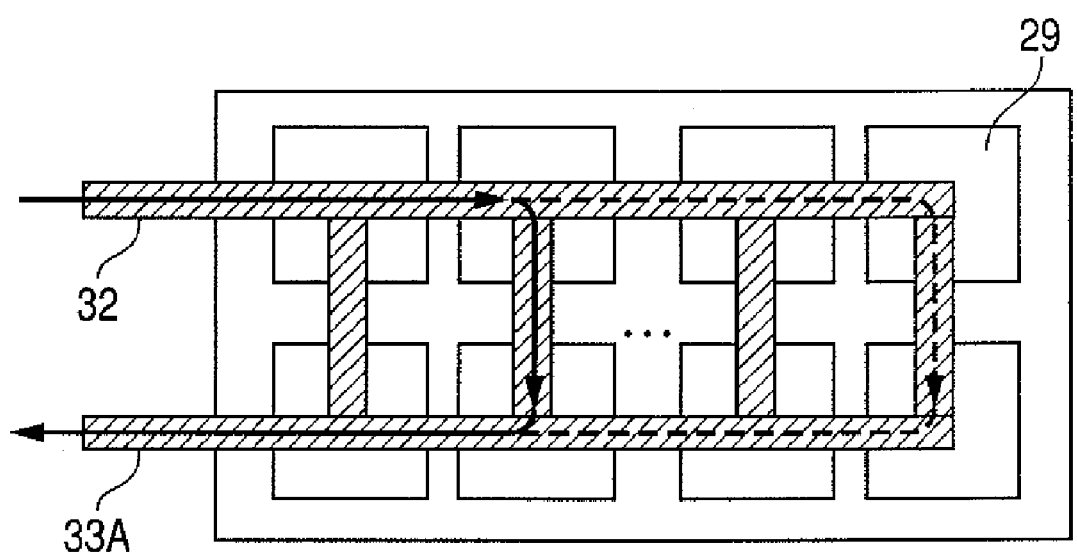
FIG. 11 is a diagram illustrating a case in which the discharge of impurity gas is not sufficient.

FIG. 10 is a schematic diagram of a flow path of hydrogen gas in a fuel cell system 40 according to Embodiment 4, and FIG. 11 is a diagram illustrating a case in which the discharge of impurity gas is not sufficient. The fuel cell system 40 according to Embodiment 4 is configured in the same manner as in Embodiment 3 with the exception that the position of the outlet 33 is changed to the same side as the inlet 32. Accordingly, the elements which are the same as those shown in FIGS. 7, 8A, and 8B are identified by like numerals or symbols, and a detailed description thereof is omitted.

In the fuel cell system 40 according to Embodiment 4, as shown in FIG. 10, the outlet 33A of the discharge-side main flow path 22 is provided on the same side as the inlet 32 and connected to the purge valve 15 as shown in FIG. 7. Thus, the flow direction of hydrogen gas in the supply-side main flow path 21 when the purge valve 15 is opened is opposite to the flow direction of hydrogen gas in the discharge-side main flow path 22.

Similarly to Embodiment 3, in the fuel cell system 40 according to Embodiment 4, the flow path resistances of the supply-side main flow path 21, the discharge-side main flow path 22, and the branch flow paths 23 of each level are designed as follows:

(1) For each branch flow path 23, the flow path resistance $R_n$ from the inlet 32 to a junction with the discharge-side main flow path 22 is smallest in a case where the flow passed through that branch flow path 23.

(2) For each branch flow path 23, the sum of the flow path resistance from the inlet 32 to the branch point of the branch flow path 23 and the flow path resistance $R_{n3}$ of the branch flow path 23 is larger than the flow path resistance from a branch point with the supply-side main flow path 21 to the inlet 32 for any one of the other branch flow paths 23.

(3) For each branch flow path 23, the flow path resistance $R_{n3}$ of the branch flow path 23 is sufficiently larger than each of the flow path resistance of the supply-side main flow path 21 from the inlet 32 to the branch point to the branch flow path 23 and the flow path resistance of the discharge-side main flow path 22 from the outlet 33A to the junction with the branch flow path 23.

(4) The flow path resistance from the inlet 32 to the outlet 33A through the branch flow path 23 is set such that, when hydrogen gas is supplied from the fuel tank 17 and the purge valve 15 is opened, the pressure within each of the power generation cells 29 becomes higher than the pressures at junctions with the branch flow path 23.

As shown in FIG. 10, when the outlet 33A is provided at a position that is not diagonal to the inlet 32, as shown in FIG. 11, hydrogen gas is supplied in a manner that centers on the power generation cells 29 near the inlet 32. As a result, it is difficult to supply hydrogen gas to power generation cells 29 that are distant from the inlet 32 and, as shown in FIG. 11, the possibility that the power generation cells 9 will be unevenly purged increases.

Therefore, by increasing the flow path resistance in accordance with the nearness of the branch flow path to the inlet 32, it is possible to alleviate the unevenness. More specifically, the flow path resistance is designed such that $R_{n3} > R_{m3}$ (n<m). In particular, by making $R_{n3} + R_{n1} + R_{n2}$ approximately identical to $R_{(n-1)3}$, the flow path resistance can be made more uniform.

Further, by implementing the design as described in (1) to (4) above, a phenomenon in which hydrogen gas flows back from the junction side through the discharge-side main flow path 22 during power generation in dead-ended mode can be effectively reduced, and an equal hydrogen gas flow rate can be secured in the power generation cells 29 to perform uniform purging.

Embodiment 5

The fuel cell systems according to Embodiment 1 to Embodiment 4 are all dead-ended fuel cell systems in which hydrogen gas is not allowed to flow out from the outlet during power generation. Further, when hydrogen gas is supplied from the inlet and the hydrogen gas is allowed to flow out from the outlet, hydrogen gas is uniformly supplied from the discharge-side main flow path to power generation cells of parallel branch flow paths in such a manner as to avoid back flows and is uniformly discharged.

Accordingly, the fuel cell systems according to Embodiment 1 to Embodiment 4 can be used as such also for a flow type in which power generation is performed while allowing hydrogen gas to continuously flow out from an outlet. In that case, the purge valve 15 is removed and a pipe line that utilizes the discharged hydrogen gas is connected.

More specifically, the present invention can be applied not only to a fuel cell system that performs a dead-ended fuel supply, but also to a fuel cell system that performs a flow type fuel supply, and can achieve a similar effect with respect to supply of fuel gas to the power generation cells.

One form of a flow type system is a power generation system in which hydrogen gas that was overflowed from an outlet of a fuel cell system is reflowed to an inlet to be recirculated in the fuel cell system. In this case, in the recirculation path that leads hydrogen gas from the outlet to the inlet, there are provided a pump that circulates (pressurizes) the hydrogen gas, an impurity gas removal apparatus that removes impurity gas from the discharged hydrogen gas, and a hydrogen gas supply apparatus that replenishes a consumed amount of hydrogen gas.

Another form of a flow type system is a power generation system that connects the fuel cell system according to any one of Embodiment 1 to Embodiment 4 as a dead-ended fuel cell system to an outlet of the fuel cell system according to any one of Embodiment 1 to Embodiment 4. More specifically, two or more stages of fuel cell systems according to any of Embodiment 1 to Embodiment 4 that do not have the purge valve 15 are connected in series in terms of the supply of hydrogen gas, and the fuel cell system of the final stage that has the purge valve 15 attached thereto is driven as a dead-ended fuel cell system.

Furthermore, this invention can be applied not only to a fuel supply system of an air-breathing type but also to a fuel cell system that supplies oxygen to a sealed oxygen supply space. The same effect is achieved in relation to the supply of oxygen to power generation cells by forming a discharge-side main flow path and a supply-side main flow path relating to oxygen supply, and applying this as an oxygen supply system in which one or more power generation cells are disposed in a plurality of parallel branch flow paths that communicate the supply-side main flow path with the discharge-side main flow path.

EXAMPLES

Example 1

A more specific example of Embodiment 1 of the present invention will now be described. An outline of the fuel cell system according to the present example is shown in FIG. 1. In this example, the diameter of the supply-side main flow path 1 is 4 mm and the diameter of the discharge-side main flow path 2 is 3 mm. The size of a catalytic portion of the power generation cell 6 is 10 mm×30 mm, and the size of a branch flow path 3 that is in contact therewith is 10 mm×30 mm and a depth of 0.3 mm. Further, the thickness of the fuel electrode current connector 4 is 1 mm and the thickness of the oxidizer electrode current collector is 2 mm, and the thickness per unit power generation cell is 3 mm in total. Since the present fuel cell has 10 layers of power generation cells 9, the thicknesses of the supply-side main flow path 1 and the discharge-side main flow path 2 is approximately 30 mm.

When the flow in a flow path is a laminar flow, the flow path resistance is in proportion to the length of the conduit and is in inverse proportion to the cross-sectional area thereof. Accordingly, when a coefficient of resistance a is defined as (conduit length)÷(conduit cross-sectional area), the coefficients of resistance of the supply-side main flow path 1, the discharge-side main flow path 2, and the branch flow path 3 are 2.4, 4.2, and 10, respectively. Since the flow path resistance is proportional to the coefficient of resistance, it can be seen that the above described configuration satisfies the optimal conditions of flow path resistances described in Embodiment 1.

For power generation of 1A, hydrogen is consumed in a normal state at a rate of approximately 7 cc/min. If the current density in steady-state power generation of a fuel cell is taken as 200 mA/cm$^2$, then 4.2 cc/min of hydrogen is consumed per unit power generation cell. Further, for the entire fuel cell, hydrogen is consumed at a rate of 42 cc/min.

On the other hand, the total volume of flow paths within the fuel cell is about 1.5 cc. If it is assumed that all the gas in the flow paths is expelled in five seconds by purging, the flow rate necessary for the purging is 18 cc/min. Further, the pressure of hydrogen that is supplied is 1.1 atmospheric pressure to 2 atmospheric pressure (absolute pressure).

By adopting the flow path configuration as described above, supply of hydrogen to a power generation cell 9 by detour from the discharge-side flow path 2 side during power generation can be effectively reduced, and even if purging is performed during power generation, an effective purge can be carried out without being influenced by a backflow.

Further, as described with reference to FIG. 1, by providing a throttle at an inlet or outlet or the like of a branch flow path 3 or inserting a fuel diffusion electrode 5 therein, the flow path resistance of the branch flow path 3 can be further increased.

Example 2

A more specific example of Embodiment 2 of the present invention will now be described. An outline of the fuel cell system according to this example is shown in FIG. 5. Except for the thickness of the branch flow path 3, the configuration of this example is the same as that of Example 1. According to this example, the thickness of the branch flow path 3 increases with the increase of the distance thereof from the inlet 12. More specifically, the thickness of the branch flow path 3 that is nearest the inlet 12 is 0.2 mm, and the thicknesses of the adjoining branch flow paths is made larger sequentially within the range of approximately 0.02 mm to 0.07 mm. By adopting the configuration as described above, this example can be provided with a structure that satisfies the conditions described in Embodiment 2. Further, as another means, the sequential decrease of the flow path resistance can also be implemented by, for example, fixing the thickness of the branch flow path 3 to 0.3 mm, and providing a throttle or inserting a member (a porous material or the like) as a flow path resistance in each of the branch flow paths. For example, when providing throttles, the width of the throttles may be set within a range from 1 mm to 8 mm, with the width increasing sequentially with the increase of the distance from the inlet 12.

Comparative Example of Fuel Cell System

The polymer electrolyte fuel cells (proton exchange membrane fuel cells) are being widely researched and developed as power generating apparatuses for vehicular or home use for reasons such as their relatively low operating temperature and easy handleability due to employment of polymer electrolyte membranes. In a polymer electrolyte fuel cell, a polymer electrolyte membrane is used as an electrolyte and a membrane electrode assembly having catalytic electrode layers provided on both sides of the polymer electrolyte membrane is used. Power generation is performed by supplying fuel (hydrogen gas or the like) to a catalytic electrode layer on one side of the membrane electrode assembly and supplying an oxidizer (air or the like) to the other catalytic electrode layer. At that time, water is generated as a product. The reaction formula at the fuel electrode is $$H_2 \rightarrow 2H^+ + 2e^-$$

and the reaction formula at the oxidizer electrode is $$\frac{1}{2}O_2 + 2H^+ + 2e^- \rightarrow H_2O.$$

Accordingly, in order to generate power stably in the fuel cell, it is important to supply fuel and an oxidizer efficiently and also to discharge the water that is produced. In particular, a phenomenon in which water cannot be discharged and blocks the flow path is called "flooding" and becomes a factor that inhibits gas diffusion to lower the output of the fuel cell.

The theoretical voltage of a unit of membrane electrode assembly is about 1.23 V, and in most cases it is used at about 0.7V in a normal operation state. Therefore, when a higher voltage or a high power density is required, in many cases a plurality of power generation cells are stacked and the respective power generation cells are electrically connected in series. This kind of stack structure is referred to as a "cell stack", and normally within the cell stack the oxidizer flow path and the fuel flow path are separated by a member called a "separator".

Hitherto, for the fuel electrode and oxidizer electrode, flow plates of various patterns have been devised in order to efficiently carry out gas supply to the power generation cell. In particular, when stacking a plurality of power generation cells for use, for the purpose of achieving high integration, the width of flow paths is designed to be narrow and a more elaborate design is required for the flow plate. In many cases, the flow plate also serves as a separator. Further, in some cases the flow plate also serves to connect the outputs of respective fuel cells in series, and in which case it is referred to as a "bipolar plate". The flow plate disclosed in Japanese Patent Application Laid-Open No. H03-205763 is characterized in that a plurality of flow paths are disposed parallel to one another in a flow plate.

Further, to improve the discharge of produced water or moving water in an oxidizer electrode and the diffusion of oxygen in the oxidizer, according to Japanese Patent Application Laid-Open No. H06-267564, a fuel flow plate is provided at the fuel electrode and an oxidizer flow plate is provided at the oxidizer electrode. At least one of the depth and the width of the oxidizer flow path of the oxidizer flow plate is made gradually smaller along the direction from the upstream flow path area to the downstream flow path area for the oxidizer.

Various primary batteries and secondary batteries have been used in order to use small electronic devices in a portable manner. However, power consumption has increased accompanying the enhance of performance of small electronic devices in recent years, and it is becoming no longer possible to supply sufficient energy with a small, lightweight primary battery.

Meanwhile, although secondary batteries have the advantage that they can be repeatedly charged and used, the energy that can be used by one charging operation is less than that of a primary battery. Further, a separate power source is required to charge the secondary battery, and charging normally requires several tens of minutes to several hours, and it is thus difficult to make it possible for secondary batteries to be used whenever and wherever needed.

From now on, size reduction and weight reduction of electronic devices will proceed further, and the tendency for portable use of devices will increase as the result of implement of wireless network environments. Under such circumstances, it will be difficult for the conventional primary batteries and secondary batteries to supply energy that is sufficient to drive the devices.

Small fuel cells are attracting attention as a method of solving such problem. Heretofore, fuel cells have been developed as large-size power generators, driving sources for automobiles and the like. The main reasons for this is that in comparison to the conventional power generation systems, fuel cells have high power generation efficiency and, furthermore, their waste matter is clean. In contrast, the reasons for fuel cells being useful as driving sources for small electronic devices are that the energy amount that can be supplied per volume and per weight is from several times to nearly ten times that of the conventional batteries. Further, since a fuel cell can be continuously used by replacing only the fuel, time is not required for charging, unlike other secondary batteries.

Fuel cells that employ various systems have been invented, and for small electronic devices, in particular devices that are used in a portable manner, a polymer electrolyte fuel cell is suitable. This is because a polymer electrolyte fuel cell has the advantages that it can be used at near ambient temperature, and that it can be carried around safely since the electrolyte is not a fluid but a solid.

Methanol has conventionally been studied as the fuel of a fuel cell for small electronic devices. The main reasons for this are that methanol is a fuel that is easy to store and easy to obtain. In a fuel cell which is intended to obtain a large output, the use of hydrogen as a fuel is effective. As a method for storing hydrogen, the hydrogen can be stored in a tank in a gaseous state, or a tank filled with a storage material such as a hydrogen storage alloy can be used.

When using a plurality of fuel cells for a fuel cell system for small electronic devices, in addition to the conventional stacking method, a planar array system is also often used in which fuel cell are disposed on the same plane and connected in series using three-dimensional wiring technology. This is because, in small fuel cells, in most cases air is used as an oxidizer and is incorporated by natural diffusion in order to reduce the size of the entire system, and the planar array system has the advantage of incorporating air more efficiently.

Further, for large fuel cell systems in most cases fuel is supplied and circulated in an amount which is greater than the amount consumed in power generation, while in fuel cell systems for small electronic devices, in most cases a technique is used in which the fuel flow path is made in a dead end structure and fuel is replenished only in an amount corresponding to consumed fuel.

In this case, however, a problem has been pointed out that impurity such as water vapor or nitrogen accumulates in the fuel flow path and the power generation efficiency lowers with the elapse of time. Therefore, a purge valve has been provided in the flow path and purging has been periodically performed. U.S. Pat. No. 6,423,437 above discloses technology that prevents the lowering in power generation characteristics in a dead-ended small fuel cell by purging a fuel flow path with a passive mechanism without using an active purge valve.

However, in the conventional technology, although various contrivances have been made with respect to flow plates of fuel electrodes or oxidizer electrodes, there has been no technology that takes into consideration the relations between the resistance of a flow path up to an electrode chamber, the resistance of a flow path following the electrode chamber, and the flow path resistance of the electrode chamber. For this reason, for smaller systems, there has been a concern of occurrence of gas backflows or deviations in flow rate between fuel cells. Further, in cases where produced water blocked a flow path, in some cases a force for discharging the water could not be effectively applied to a water droplet. Furthermore, almost no consideration has been given to flow path resistance in planar array fuel cell stacks and dead-ended fuel cells.

In contrast, in the fuel cell system according to Embodiments 1 to 4:

(1) For each branch flow path, the flow path resistance from the inlet to the junction with the discharge-side main flow path is smallest in a case where the flow passed through the relevant branch flow path.

(2) For each branch flow path, the sum of the flow path resistance from the inlet to the branch point of the branch flow path and the flow path resistance of the branch flow path is larger than the flow path resistance from the branch point with the supply-side main flow path to the inlet in anyl of the other branch flow paths.

(3) For each branch flow path, the flow path resistance of the branch flow path is sufficiently larger than each of the flow path resistance of the supply-side main flow path from the inlet to the branch point to the branch flow path and the flow path resistance of the discharge-side main flow path from the outlet to the junction with the branch flow path.

As a result, the flow of fuel and an oxidizer can be smoothly guided from an inlet to an outlet. Further, there is an effect that when a flow path is blocked by water, the water is easily discharged. It is thus possible to improve the stability of power generation of the fuel cell.

(Correspondence to Invention)

The fuel cell system 10 comprises a supply-side main flow path 1 that leads fuel gas guided from the inlet 12 to a plurality of parallel branch flow paths 3 that are branched at separate positions, and each of the branch flow paths 3 has at least one power generation cell 9. The fuel cell system 10 also comprises a discharge-side main flow path 2 that merges at respective positions with the outlet side of the plurality of branch flow paths 3 to lead fuel gas in the power generation cells 9 to the outlet 13. For all of the branch flow paths 3, the flow path resistances of the supply-side main flow path 1, the discharge-side main flow path 2, and the plurality of branch flow paths 3 are set as follows.

The flow path resistance from the inlet 12 to a junction of a branch flow path 3 with the discharge-side main flow path 2 when a flow passes through the branch flow path 3 is less than the flow path resistance when the flow passes through any other branch flow path 3 as a detour.

According to the fuel cell system 10, at the junctions of all of branch flow paths 3 with the discharge-side main flow path 2, the flow path resistance when the flow passes through a branch flow path 3 concerned is less than the flow path resistance when the flow passes through any other branch flow path 3 than the branch flow path 3 concerned.

More specifically, the configuration is such that the flow path resistances of branch flow paths 3 each having a fuel diffusion electrode 5 disposed are set to be substantially the same, the discharge-side main flow path 2 is made thinner than the supply-side main flow path 1, and the flow path resistances of the respective detours are set to be greater with the increase of the length of the supply-side main flow path 1 which constitutes the detour.

Accordingly, at branch points with branch flow paths 3 in the supply-side main flow path 1, fuel gas flows into a power generation cell 9 of a branch flow path 3 concerned without passing through a branch flow path 3 as a detour different from the branch flow path 3 concerned. Further, during power generation, even in a situation in which hydrogen is consumed in a power generation cell 9, at a junction with the discharge-side main flow path 2, since a pressure decrease caused by the flow path resistance is greater for fuel gas that passes through a different branch flow path 3 as a detour, it is difficult for the fuel gas to flow back to the branch flow path 3 concerned.

In other words, when hydrogen gas within a plurality of power generation cells 9 is discharged through the discharge-side main flow path 2, the following relation of (pressure at branch point with supply-side main flow path 1)>(pressure inside power generation cell 9)>(pressure at junction with discharge-side main flow path 2) is established for all of the branch flow paths 3.

Accordingly, impurity gas that resides/accumulates in all of the power generation cells 9 is smoothly and linearly pushed out to the discharge-side main flow path 2 in a synchronized manner. Even with a limited amount of low-pressure fuel gas, impurity gas can be efficiently discharged through the discharge-side main flow path 2 without leaving a large amount of impurity gas in a part of the plurality of power generation cells 9. By uniformly removing impurity gas, hydrogen gas partial pressure can be uniformly secured in the plurality of power generation cells 9 to perform uniform power generation.

It is therefore possible to adequately exert the latent power generation capability of each power generation cell 9 to achieve high power generation efficiency with little variation, so that the overall power generation performance of the fuel cell system 10 is improved and stabilized.

The fuel cell system 10 comprises a supply-side main flow path 1 that leads fuel gas guided from the inlet 12 to a plurality of parallel branch flow paths 3 that are branched at separate positions, and each of the branch flow paths 3 has at least one power generation cell 9. The fuel cell system 10 also comprises a discharge-side main flow path 2 that merges at respective positions with the outlet of the plurality of branch flow paths 3 to lead fuel gas in the power generation cells 9 to the outlet 13. A flow path resistance from the inlet 12 to a junction with the discharge-side main flow path 2 that passes a branch flow path 3 on a side that is near the inlet 12 is set to be larger than a flow path resistance from the inlet 12 to a branch point with the supply-side main flow path 1 for a branch flow path 3 positioned on a side that is distant from the inlet 12.

Accordingly, fuel gas that should go toward the branch flow path 3 that is distant from the inlet 12 does not flow into the branch flow path 3 that is near the inlet 12. The pressure inside a power generation cell 9 that is distant from the inlet 12 is not less than the pressure inside the discharge-side main flow path 2. Even in a power generation cell 9 that is distant from the inlet 12, fuel gas is secured at the same level as a power generation cell 9 that is close to the inlet, and thus for all of the power generation cells 9, impurity gas that resides/accumulates is smoothly and linearly pushed out to the discharge-side main flow path 2 in a synchronized manner. Even with a limited amount of low-pressure fuel gas, impurity gas can be efficiently discharged through the discharge-side main flow path 2 without leaving a large amount of impurity gases in a part of the plurality of power generation cells 9. By uniformly removing impurity gas, hydrogen gas partial pressure can be uniformly secured in the plurality of power generation cells 9 to perform uniform power generation.

In the fuel cell system 10, for all of the branch flow paths 3, the flow path resistance thereof is greater than each of the flow path resistance from the inlet 12 to a branch point with the supply-side main flow path 1 and the flow path resistance from a junction with the discharge-side main flow path 2 to the outlet 13.

In the fuel cell system 10, for each of the branch flow paths 3, the flow path resistance that passes through the branch flow paths 3 from the inlet 12 to the junction with the discharge-side main flow path 2 is set such that when fuel gas is supplied from the inlet 12 and discharged from the outlet 13 at a pressure of normal operation, the pressure inside the power generation cell 9 is higher than the pressure at the junction.

In the fuel cell system 10, the inlet 12 and outlet 13 are disposed such that the flow directions of fuel gas are opposite between the supply-side main flow path 1 and the discharge-side main flow path 2, and the flow path resistance at downstream of the power generation cell 9 in the branch flow path 3 is set to be smaller with increase of the distance of the branch flow path 3 from the inlet 12.

In the fuel cell system 10, the purge valve 15 that allows the discharge-side main flow path 2 to be open to the atmosphere is connected to the outlet 13, and the fuel tank 17 that supplies hydrogen gas to the supply-side main flow path 1 to operate the power generation cells 9 is connected to the inlet 12.

The fuel cell system 10 includes the fuel diffusion electrode 5 that is disposed on one surface side of the membrane electrode assembly 6 and guides fuel gas supplied through a branch flow path 3 to the outlet side of the branch flow path 3 while diffusing the fuel gas to the one surface side, and the oxygen diffusion electrode 7 that is disposed on the other surface side of the membrane electrode assembly 6 and diffuses atmospheric oxygen to the other surface side.

The fuel cell system 10 includes the cell stack 10S in which the plurality of power generation cells 9 are stacked and connected in series, and in the oxygen diffusion electrode 7, at least one part of the side surface thereof is open to the atmosphere at a side surface of the cell stack 10S, and the supply-side main flow path 1 and the discharge-side main flow path 2 are configured so as to cause through holes for each power generation cell 9 formed at the same planar positions on the outside of the power generation cell 9 to communicate with each other.

In the fuel cell system 30, the plurality of power generation cells 29 are disposed in a planar configuration on a common flow path plate 31, the oxygen diffusion electrode 27 is disposed such that at least a part of its surface on the side opposite to the membrane electrode assembly 26 is open to the atmosphere, and the supply-side main flow path 21 and the discharge-side main flow path 22 are disposed on the flow path substrate 36.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-016874, filed Jan. 25, 2006, which is hereby incorporated by reference in its entirety.

What is claimed is:

1. A fuel cell system comprising a supply port, a supply-side main flow path, a discharge-side main flow path, a plurality of branch flow paths, and a discharge port, in which the supply-side main flow path is connected to the supply port;

the plurality of branch flow paths are, respectively, connected to the supply-side main flow path and the discharge-side main flow path;

each of the plurality of branch flow paths has at least one power generation cell; and the discharge-side main flow path is connected to the discharge port, wherein the plurality of branch flow paths include at least a first branch flow path and a second branch flow path, wherein, with respect to each of the branch flow paths, a magnitude of a flow path resistance obtained by summing a flow path resistance from the supply port to a junction between the supply-side main flow path and the first branch flow path and a flow path resistance from a junction between the first branch flow path and the supply-side main flow path to a junction between the first branch flow path and the discharge-side main flow path is less than the magnitude of a flow path resistance obtained by summing a flow path resistance from the supply port to a junction of the supply-side main flow path with the second branch flow path that is different from the first branch flow path, a flow path resistance from a junction between the second branch flow path and the supply-side main flow path to a junction between the second branch flow path and the discharge-side main flow path, and a flow path resistance from a junction between the second branch flow path and the discharge-side main flow path to a junction between the first branch flow path and the discharge-side main flow path, and wherein when the fuel cell system has N units of the branch flow paths, a flow path resistance from a junction between an $(n-1)^{th}$ branch flow path counting from a side near the supply port and the supply-side main flow path to a junction between an $n^{th}$ branch flow path and the supply-side main flow path is represented by $R_{n1}$, and a flow path resistance from a junction between the $n^{th}$ branch flow path and the supply-side main flow path to a junction between the $n^{th}$ branch flow path and the discharge-side main flow path is represented by $R_{n3}$, the following relationship:

$$\sum_{k=1}^{n} R_{k1} + R_{n3} > \sum_{k=1}^{m} R_{k1}$$

is established (provided n<m≤N and 2≤n).

* * * * *